UNITED STATES PATENT OFFICE.

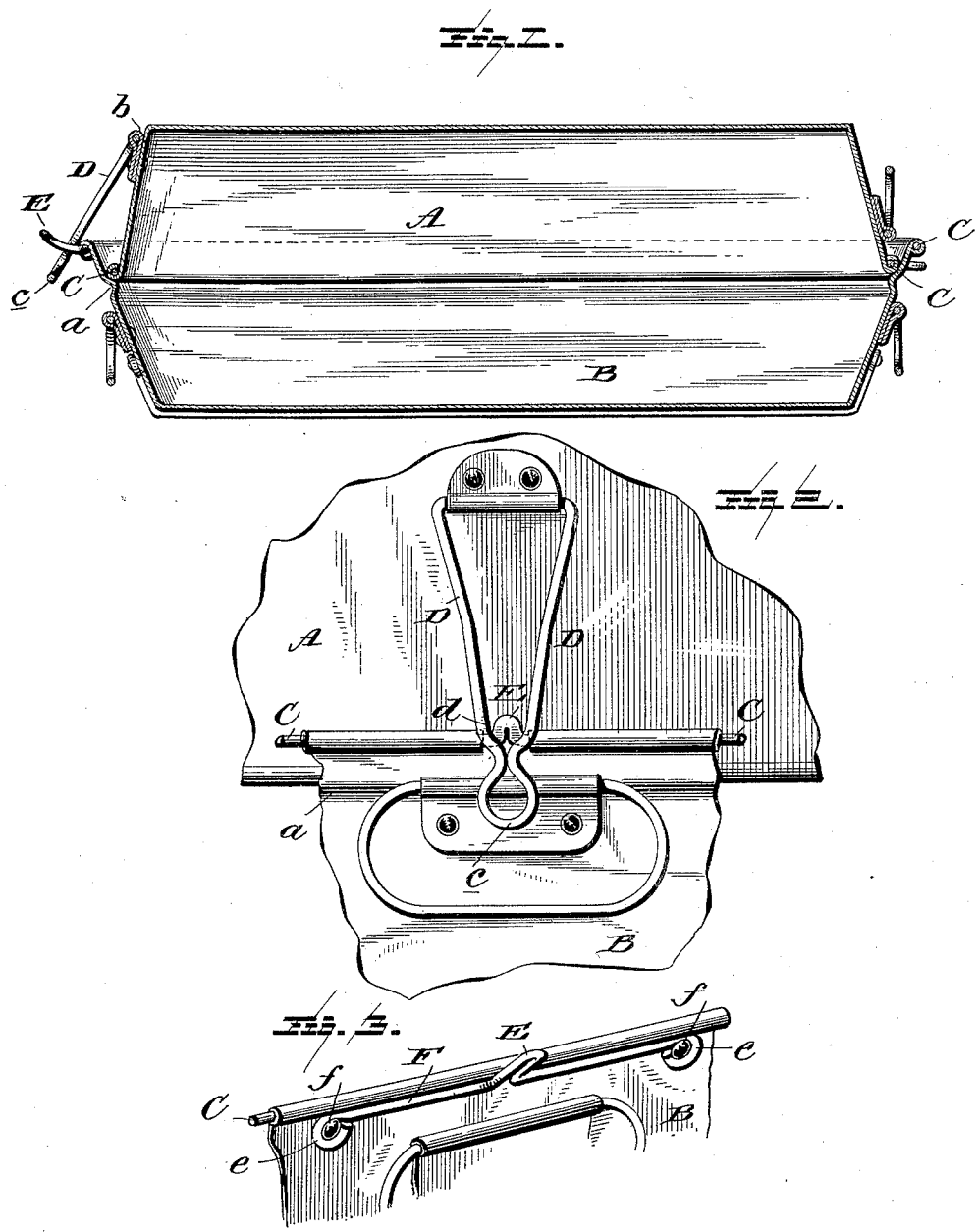

JOHN F. BARBER AND JOSIAH STEVENS, OF HAZLETON, PENNSYLVANIA.

CATCH FOR BAKE-PANS.

SPECIFICATION forming part of Letters Patent No. 466,915, dated January 12, 1892.

Application filed May 2, 1891. Serial No. 391,421. (No model.)

*To all whom it may concern:*

Be it known that we, JOHN F. BARBER and JOSIAH STEVENS, citizens of the United States, residing at Hazleton, in the county of Luzerne, State of Pennsylvania, have invented certain new and useful Improvements in Catches for Bake-Pans, of which the following is a specification, reference being had therein to the accompanying drawings.

This invention relates to certain new and useful improvements in catches for bake-pans; and it has for its objects among others to provide an improved catch that will hold the two pans in close contact, which will not become disengaged from use, and which will also serve as a means of handling the upper pan.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a vertical central longitudinal section through two pans provided with our improved catch and locked together thereby. Fig. 2 is an enlarged detail, in end elevation, of the parts constituting the present invention. Fig. 3 is a perspective view of a portion of the lower pan, showing a modified form of construction.

Like letters of reference indicate like parts throughout the several views where they occur.

Referring now to the details of the drawings by letter, A designates the upper and B the lower pan, both of which may be of any of the well-known or approved forms, except as hereinafter more particularly specified. The lower pan is shown as provided with a surrounding inwardly-extending rib or bead $a$, (shown best in Fig. 1,) which forms a seat for the lower edge of the upper pan. The edges of the pans are turned over to form beads, preferably, and may be strengthened by a stiffening-wire C, which may or may not be continuous, as found most desirable.

To one end of the upper pan is hinged a catch D, preferably of wire and shown as held thereto by means of the clip or clamp $b$, which consists of a piece of sheet metal doubled upon itself, as seen best in Fig. 1, the parallel portions being held to the end of the pan by rivets or the like, the catch having its horizontal portion held in the loop of the clip or clamp, as shown, so that it may be turned thereupon, as a hinge, when desired. The catch D is formed at its lower end with a loop or eye $c$, which forms a convenient means of suspending the pan when not in use, and also a handle by which it may be lifted. The two arms of the catch D are converged toward their lower ends to form a wedge-shaped recess $d$, the said arms being crimped inward at their junction with the loop or eye $c$, as seen clearly in Fig. 2. This forms a strong catch, one that will not yield by constant use, and one in which the projection on the lower pan will securely wedge and hold itself.

On the corresponding end of the lower pan we provide the lug or projection E, which, as shown in Fig. 2, is formed by crimping the stiffening-wire C at the proper point, the projection standing at an angle to the end of the pan and the turned-over edge of the upper edge of the pan cut away to allow of the crimping of the stiffening-wire.

In Fig. 3 we have shown the lug or projection with which the catch engages as formed in a separate piece of wire F, which is secured under the stiffening-wire on the end of the pan, being provided at its ends with loops or eyes $e$ to receive the rivets or other securing means $f$. In both forms the operation is the same. The angularly-arranged lug is rigid, and as the same engages the catch the two pans are drawn together and tightly held.

What we claim as new is—

1. The combination, with a pan and a lug thereon formed by a crimp in the wire, of another pan and a catch hinged thereto and formed with a loop, and converging arms providing a wedge-shaped recess between them, substantially as and for the purpose specified.

2. The combination, with a pan having its upper edge provided with a strengtheningwire formed with a lug provided by crimping the said wire and arranged angularly to the end of the pan, of another pan and a wire catch hinged thereto and having a loop at one
5 end, and converging arms with a wedge-shaped recess between them above the said loop, substantially as shown and described.

In testimony whereof we affix our signatures in presence of two witnesses.

JOHN F. BARBER.
JOSIAH STEVENS.

Witnesses:
CHRIST. BACHMAN,
M. SIM. JAMES.